United States Patent
Schlipf et al.

(10) Patent No.: US 12,377,961 B2
(45) Date of Patent: Aug. 5, 2025

(54) WING FOR AN AIRCRAFT WITH DAMPER FOR DAMPING UNCONTROLLED MOVEMENT BETWEEN LEADING EDGE PART AND TRAILING EDGE PART

(71) Applicant: Airbus Operations GmbH, Hamburg (DE)

(72) Inventors: Bernhard Schlipf, Hamburg (DE); Dennis Krey, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/471,719

(22) Filed: Sep. 21, 2023

(65) Prior Publication Data

US 2024/0101246 A1 Mar. 28, 2024

(30) Foreign Application Priority Data

Sep. 23, 2022 (EP) .................................. 22197474

(51) Int. Cl.
*B64C 9/18* (2006.01)
*B64C 9/02* (2006.01)
*F16F 15/02* (2006.01)

(52) U.S. Cl.
CPC ................. *B64C 9/18* (2013.01); *B64C 9/02* (2013.01); *F16F 15/02* (2013.01); *F16F 2228/066* (2013.01)

(58) Field of Classification Search
CPC .... B64C 9/02; B64C 9/16; B64C 9/18; B64C 9/20
See application file for complete search history.

(56) References Cited

U.S. PATENT DOCUMENTS

| | | | |
|---|---|---|---|
| 4,483,498 A | 11/1984 | Boehringer | |
| 5,203,524 A * | 4/1993 | Laceby | B64C 9/16 244/215 |
| 2012/0091282 A1* | 4/2012 | Spiller | B64D 45/0005 701/33.9 |

(Continued)

FOREIGN PATENT DOCUMENTS

| | | |
|---|---|---|
| DE | 3505839 A1 | 8/1986 |
| DE | 102009051983 A1 | 5/2011 |
| EP | 2851287 A1 | 3/2015 |

OTHER PUBLICATIONS

European Search Report for corresponding European U.S. Appl. No. 22/197,474 dated Feb. 21, 2023.

*Primary Examiner* — Arfan Y. Sinaki
(74) *Attorney, Agent, or Firm* — Greer, Burns & Crain, Ltd.

(57) ABSTRACT

A wing component for an aircraft, comprising a leading edge part and a trailing edge part pivotably mounted to the leading edge part so as to pivot about a pivot axis, an actuator unit configured for moving the trailing edge part relative to the leading edge part, and a damper device configured for damping uncontrolled movement between the leading edge part and the trailing edge part. The trailing edge part comprises a first part portion and a second part portion arranged next to each other in a span direction and configured to pivot about the pivot axis individually, the damper device comprises a damping element coupled between the first part portion and the second part portion to damp relative movement of the first part portion and the second part portion.

15 Claims, 6 Drawing Sheets

(56) References Cited

U.S. PATENT DOCUMENTS

| | | |
|---|---|---|
| 2012/0312932 A1 | 12/2012 | Hue et al. |
| 2013/0327887 A1* | 12/2013 | Dyckrup ............... B64C 13/341 |
| | | 244/99.3 |
| 2015/0083853 A1 | 3/2015 | Moser et al. |
| 2021/0061446 A1* | 3/2021 | Good ...................... B64C 13/16 |
| 2023/0312080 A1* | 10/2023 | Schlipf .................... B64C 9/20 |
| | | 244/215 |

* cited by examiner

WING FOR AN AIRCRAFT WITH DAMPER FOR DAMPING UNCONTROLLED MOVEMENT BETWEEN LEADING EDGE PART AND TRAILING EDGE PART

CROSS-REFERENCES TO RELATED APPLICATIONS

This application claims the benefit of European Patent Application Number 22197474.4 filed on Sep. 23, 2022, the entire disclosure of which is incorporated herein by way of reference.

FIELD OF THE INVENTION

The present invention relates to a wing component for an aircraft. A further aspect of the invention relates to an aircraft comprising such a wing component. The wing component comprises a leading edge part and a trailing edge part mounted to the leading edge part in a manner pivotable about a pivot axis. The wing component further comprises an actuator unit configured for moving the trailing edge part relative to the leading edge part, and a damper device configured for damping uncontrolled movement between the leading edge part and the trailing edge part.

The wing component might be a wing, wherein the leading edge part might be a main wing and the trailing edge part might be an aileron, a spoiler, or a trailing edge flap. Alternatively, the wing component might be a wing comprising a main wing and a trailing edge high lift assembly including a flap, wherein the leading edge part is a main flap part and the trailing edge part is a tab pivotably mounted to the trailing edge of the main flap part. As a further alternative, the wing component might be a trailing edge flap, i.e. a flap of a trailing edge high lift assembly, wherein the leading edge part is a main flap part and the trailing edge part is a tab pivotably mounted to the trailing edge of the main flap part. As a further alternative, the wing component might be a foldable wing tip configured for being pivotably mounted to a main wing, wherein the leading edge part is a main wing tip part and the trailing edge part is a tab pivotably mounted to the trailing edge of the main wing tip part. Further applications of the wing component are possible.

In a preferred embodiment of the invention, the wing component is a wing comprising a main wing and a trailing edge high lift assembly. The trailing edge high lift assembly is movably arranged at a trailing edge of the main wing and comprises a flap and a connection assembly. The connection assembly movably mounts the flap to the main wing, such that the flap is movable relative to the main wing between a retracted position with a reduced chord length and/or curvature of the wing, and at least one extended position with an extended chord length and/or curvature of the wing. The connection assembly preferably comprises an actuation system, e.g. including a rotary motor or a linear motor, for moving the flap between the retracted position and the at least one extended position. The flap comprises the leading edge part, in particular formed as a main flap part, comprising the leading edge of the flap, and the trailing edge part, in particular formed as a tab, comprising the trailing edge of the flap and mounted to the leading edge part, in particular to the trailing edge of the leading edge part, in a manner pivotable about a pivot axis preferably extending in a span direction. The trailing edge high lift assembly comprises the actuator unit configured for moving the trailing edge part relative to the leading edge part about the pivot axis. The actuator unit might be part of the actuation system for moving the flap between the retracted position and the at least one extended position, or might be separate from the actuation system. The flap comprises the damper device configured for damping uncontrolled movement between the leading edge part and the trailing edge part, e.g. in case of a failure of the actuator unit.

BACKGROUND OF THE INVENTION

Similar wing components are known in the art. Some known wings comprise a trailing edge high lift assembly having a flap that is movable relative to the main wing in a rotational manner, e.g. by the flap being fixedly mounted on a lever that is rotatably mounted to the trailing edge of the main wing and that is driven by a drive strut mounted to a rotating drive arm. Other known wings have a trailing edge high lift assembly with a flap that is movable relative to the main wing in a combined linear and rotational manner, e.g. by the flap being rotatably mounted on a carriage running along a linear guide rail while the flap is driven by a drive strut mounted to a rotating drive arm, so that the flap carries out a coupled linear and rotational motion. Such trailing edge high lift assemblies are designed to be deployed during take-off and landing of an aircraft to increase lift and reduce minimum air speed by increasing wing area, curvature, and angle of attack, and to be retracted during cruise flight when air speed is high to reduce drag.

More recent investigations have shown that it might be advantageous to have a morphing wing that might adjust wing area, curvature, and angle of attack during the entire flight, e.g. as a "real-time" response to gust or to optimize lift, drag and structural loading during the flight. This can be achieved by the two-part flap comprising leading edge part and trailing edge part which can be moved relative to one another as required.

To avoid uncontrolled flutter movement of the trailing edge part relative to the leading edge part of the flap in case of failure of the actuator unit, the damper device is provided. A straightforward solution would be to include the damper device into the load path of the actuator unit. However, in this way failure of the actuator unit might also affect operation of the damper. Further, a damper device combined with the actuator unit requires essential space at the flap that might not be available in any case.

SUMMARY OF THE INVENTION

An object of the invention is to provide a wing component comprising a trailing edge high lift assembly having a more efficient, failure-tolerant and space-efficient damper device.

This object may be achieved in that the trailing edge part comprises a first part portion and a second part portion that are formed separately, arranged next to each other in a span direction and configured to pivot about the pivot axis individually, preferably independently from one another. The pivot axis is preferably one common, coaxial axis about which both the first part portion and the second part portion pivots. However, it is also possible that the pivot axis is different for the first part portion and the second part portion, so that the part of the pivot axis about which the first part portion pivots is not coaxial with the part of the pivot axis about which the second part portion pivots. Preferably, the actuator unit comprises a first actuator element and a second actuator element, wherein the first actuator element is coupled between the first part portion and the leading edge part for moving the first part portion relative to the leading edge part, and wherein the second actuator element is coupled between the second part portion and the leading edge part for moving the second part portion relative to the leading edge part. The damper device comprises a damping element coupled between the first part portion and the second part portion to damp relative movement of the first part portion and the second part portion about the pivot axis. This means, when the first part portion and the second part portion are moved synchronously, no damping occurs as no relative movement between the first part portion and the second part portion occurs. However, when the first part portion and the second part portion move in an asynchronous way, as would be the case during uncontrolled flutter of the first part portion and/or the second part portion caused e.g. by a failure of the actuator unit, in particular of the first actuator element and/or of the second actuator element, the damping element causes a damping effect with respect to said asynchronous movement.

Such a damper device introducing a relative damping between the first and second part portions will not be affected by failure of the actuator unit and is thus very failure-tolerant. Further, the damper device does not require much space and its position does not depend on the actuator unit, so it can be formed in a very space-efficient way. Additionally, by the connection of the first and second part portions through the damping element, in case of failure of one of the first and second actuator elements, the respective first or second part portion related to the failing first or second actuator element can be moved through the other one of the first and second part portions and the associated still-operating first or second actuator element.

According to a preferred embodiment, the damper device comprises a first linkage and/or a second linkage preferably arranged next to the first linkage in the span direction. The first linkage is coupled between the first part portion and the damping element, and the first linkage is preferably configured to translate a pivot movement of the first part portion into a linear movement of the damping element, preferably in the span direction. Additionally or alternatively, the second linkage is coupled between the second part portion and the damping element, and the second linkage is preferably configured to translate a pivot movement of the second part portion into a linear movement of the damping element, preferably in the span direction or at least in the same direction as the linear movement of the damping element caused by the first linkage. Such first and second linkages represent an efficient way of translating pivot movement of the first and second part portions into linear spanwise movement of the damping element and thus allow a linear damping element to be employed as well as a simple and symmetric arrangement of the damper device.

In particular, it is preferred that the first linkage comprises a first link mounted to the first part portion in a way rotatable about a first link axis spaced apart from the pivot axis, preferably in parallel to the pivot axis. Additionally or alternatively, the second linkage comprises a second link mounted to the second part portion in a way rotatable about a second link axis spaced apart from the pivot axis, preferably in parallel to the pivot axis. In such a way, a very efficient linkage is formed.

It is further preferred that the first linkage comprises a first deflector element mounted to the leading edge part in a way rotatable about a first deflector axis, wherein the first deflector axis extends transversely, preferably perpendicularly, to the pivot axis. The first deflector element is configured to deflect a direction of linear movement and might be formed as e.g. a rocker element, a wheel, or a disc. The first link is mounted to the first deflector element in a way rotatable about a first input axis spaced apart from the first deflector axis, preferably in parallel to the first deflector axis. Additionally or alternatively, the second linkage comprises a second deflector element mounted to the leading edge part in a way rotatable about a second deflector axis, wherein the second deflector axis extends transversely, preferably perpendicularly, to the pivot axis. The second deflector element is configured to deflect a direction of linear movement and might be formed as e.g. a rocker element, a wheel, or a disc. The second link is mounted to the second deflector element in a way rotatable about a second input axis spaced apart from the second deflector axis, preferably in parallel to the second deflector axis. In such a way, a very efficient linkage is formed.

It is also preferred that the damping element has a first coupling end, preferably in the form of a rod, and an opposite second coupling end, preferably in the form of a rod. The damping element is configured to damp relative linear movement of the first coupling end and the second coupling end. In such a way, a very simple and efficient damper device is formed.

It is further preferred that the first coupling end is mounted to the first deflector element in a way rotatable about a first output axis spaced apart from the first deflector axis and from the first input axis, preferably in parallel to the first deflector axis and the first input axis. Additionally or alternatively, the second coupling end is mounted to the second deflector element in a way rotatable about a second output axis spaced apart from the second deflector axis and from the second input axis, preferably in parallel to the second deflector axis and the second input axis. Preferably, the first coupling end is mounted to the first deflector element and the second coupling end is mounted to the second deflector element in such a way that the damping element between the first and second coupling ends extends in the span direction. In such a way, a very simple and efficient damper device is formed.

According to a preferred embodiment, the trailing edge part comprises a third part portion formed separately from the first and second part portions, arranged next to the second part portion in the span direction and configured to pivot about the pivot axis individually, preferably independently from the first and second part portions. The damping element is a first damping element and the damper device comprises a second damping element coupled between the second part portion and the third part portion to damp relative movement of the second part portion and the third part portion.

In particular, it is preferred that the damper device comprises a third linkage, preferably arranged next to the second linkage in the span direction. The third linkage is coupled between the third part portion and the second damping element, and the third linkage is preferably configured to translate a pivot movement of the third part portion into a linear movement of the second damping element, preferably in the span direction or at least in the same direction as the linear movement of the second damping element caused by the second linkage. In such a way, a chain of interconnected damping elements and respective linkages are formed. More than three part portions and respective linkages are also possible.

It is also preferred that the third linkage comprises a third link mounted to the third part portion in a way rotatable about a third link axis spaced apart from the pivot axis and preferably in parallel to the pivot axis. In such a way, a very simple and efficient linkage is formed.

It is further preferred that the third linkage comprises a third deflector element mounted to the leading edge part in a way rotatable about a third deflector axis, wherein the third deflector axis extends transversely, preferably perpendicularly, to the pivot axis. The third deflector element is configured to deflect a direction of linear movement and might be formed as e.g. a rocker element, a wheel, or a disc. The third link is mounted to the third deflector element in a way rotatable about a third input axis spaced apart from the third deflector axis and preferably in parallel to the third deflector axis. In such a way, a very simple and efficient linkage is formed.

It is further preferred that the second damping element has a first coupling end, preferably in the form of a rod, and an opposite second coupling end, preferably in the form of a rod. The second damping element is configured to damp relative linear movement of its first coupling end and its second coupling end. In such a way, a very simple and efficient damper device is formed.

It is further preferred that the first coupling end of the second damping element is mounted to the second deflector element in a way rotatable about the second output axis or about a further output axis spaced apart from the second deflector axis and from the second input axis, preferably in parallel to the second deflector axis and the second input axis. Additionally or alternatively, the second coupling end of the second damping element is mounted to the third deflector element in a way rotatable about a third output axis spaced apart from the third deflector axis and from the third input axis, preferably in parallel to the third deflector axis and the third input axis. Preferably, the first coupling end of the second damping element is mounted to the second deflector element and the second coupling end of the second damping element is mounted to the third deflector element in such a way that the second damping element between the first and second coupling ends extends in the span direction and preferably coaxial to the first damping element. In such a way, a very simple and efficient damper device is formed.

According to a preferred embodiment, the damping element, in particular the first damping element and/or the second damping element, is formed as a velocity-dependent damping element having a damping characteristic with essentially higher damping effect for high velocity motion of the first, second and/or third part portions, as would be the case for instable flutter of the first, second and/or third part portions, and essentially lower or no damping effect for low velocity motion of the first, second and/or third part portions, as would be the case for controlled movement of the first, second and/or third part portions, e.g. for gust response. By such a velocity-dependent damping element uncontrolled flutter can be damped while the trailing edge part and its first, second, and/or third part portions, respectively, can be used to control the wing and the associated aircraft about its axes.

According to a preferred embodiment, the wing component is a wing comprising a main wing and a trailing edge high lift assembly movably arranged at a trailing edge of the main wing. The trailing edge high lift assembly comprises a flap and a connection assembly for movably mounting the flap to the main wing, such that the flap is movable between a retracted position and at least one extended position. The flap comprises the leading edge part and the trailing edge part mounted to the leading edge part in a manner pivotable about the pivot axis. Such a wing represents a very useful application of the present invention.

A further aspect of the present invention relates to an aircraft comprising the wing component according to any of the embodiments explained above. The features and effects explained above in connection with the wing component apply vis-à-vis also to the aircraft.

BRIEF DESCRIPTION OF THE DRAWINGS

Hereinafter, a preferred embodiment of the present invention is described in more detail by means of the drawings, in which.

DETAILED DESCRIPTION OF THE PREFERRED EMBODIMENTS

Figure 1:
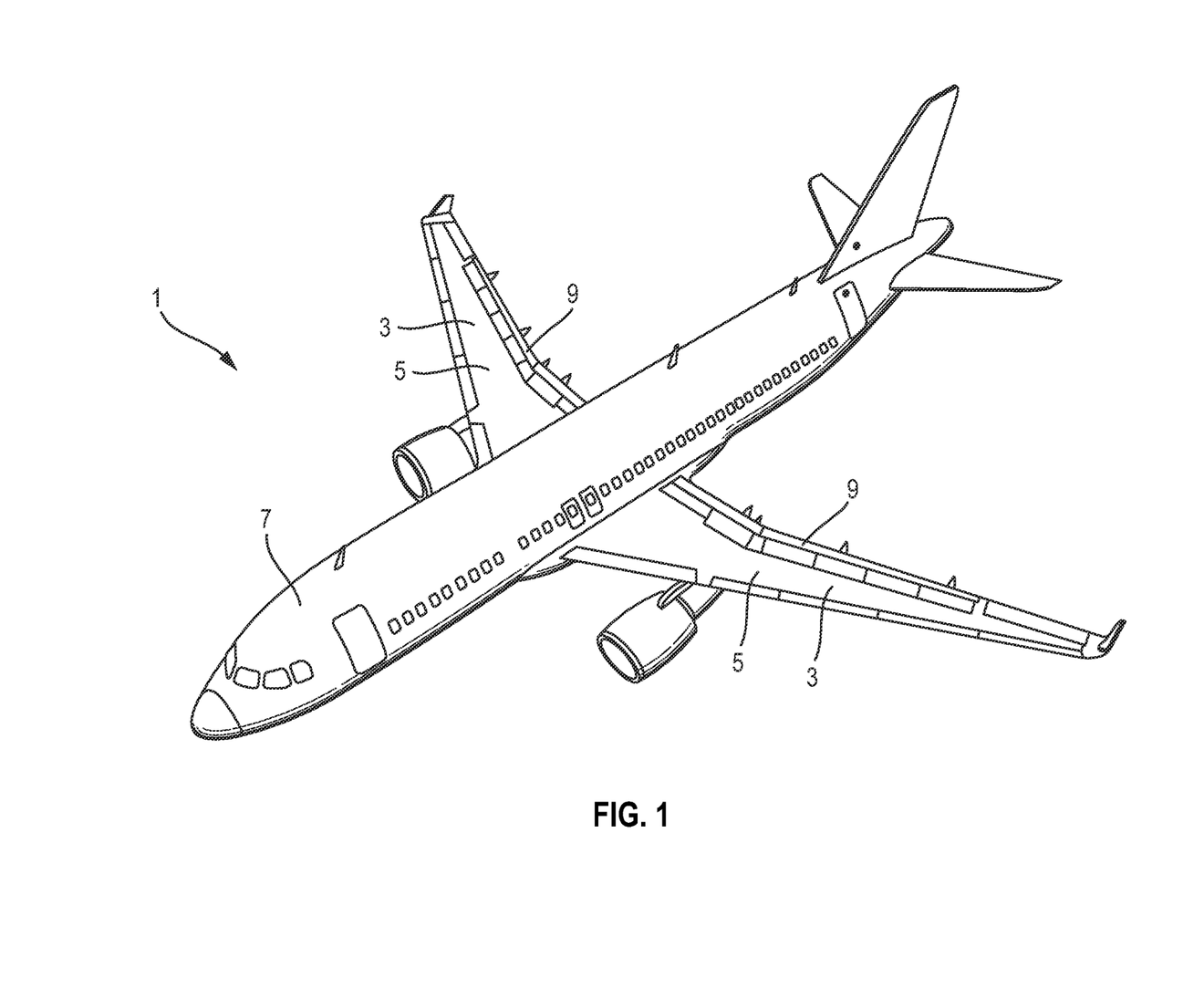
FIG. 1 is a perspective view of an aircraft according to an embodiment of the invention.

FIG. 1 shows an exemplary aircraft 1 according to an embodiment of the present invention. The aircraft 1 comprises a wing component 3 in the form of a wing including a main wing 5 mounted to a fuselage 7, and a trailing edge high lift assembly 9 including a flap 11 movably mounted to the main wing 5.

Figure 2:
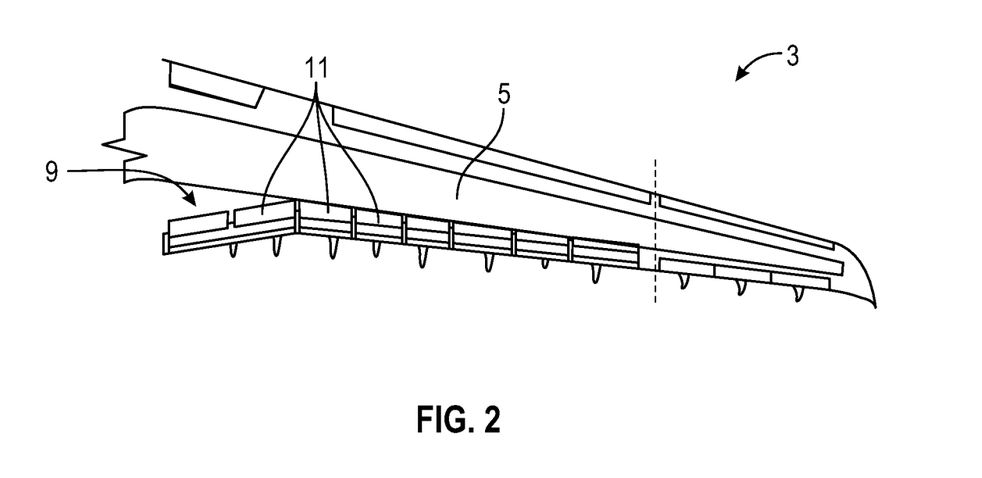
FIG. 2 is a top view of a wing of the aircraft shown in FIG. 1.
Figure 3:
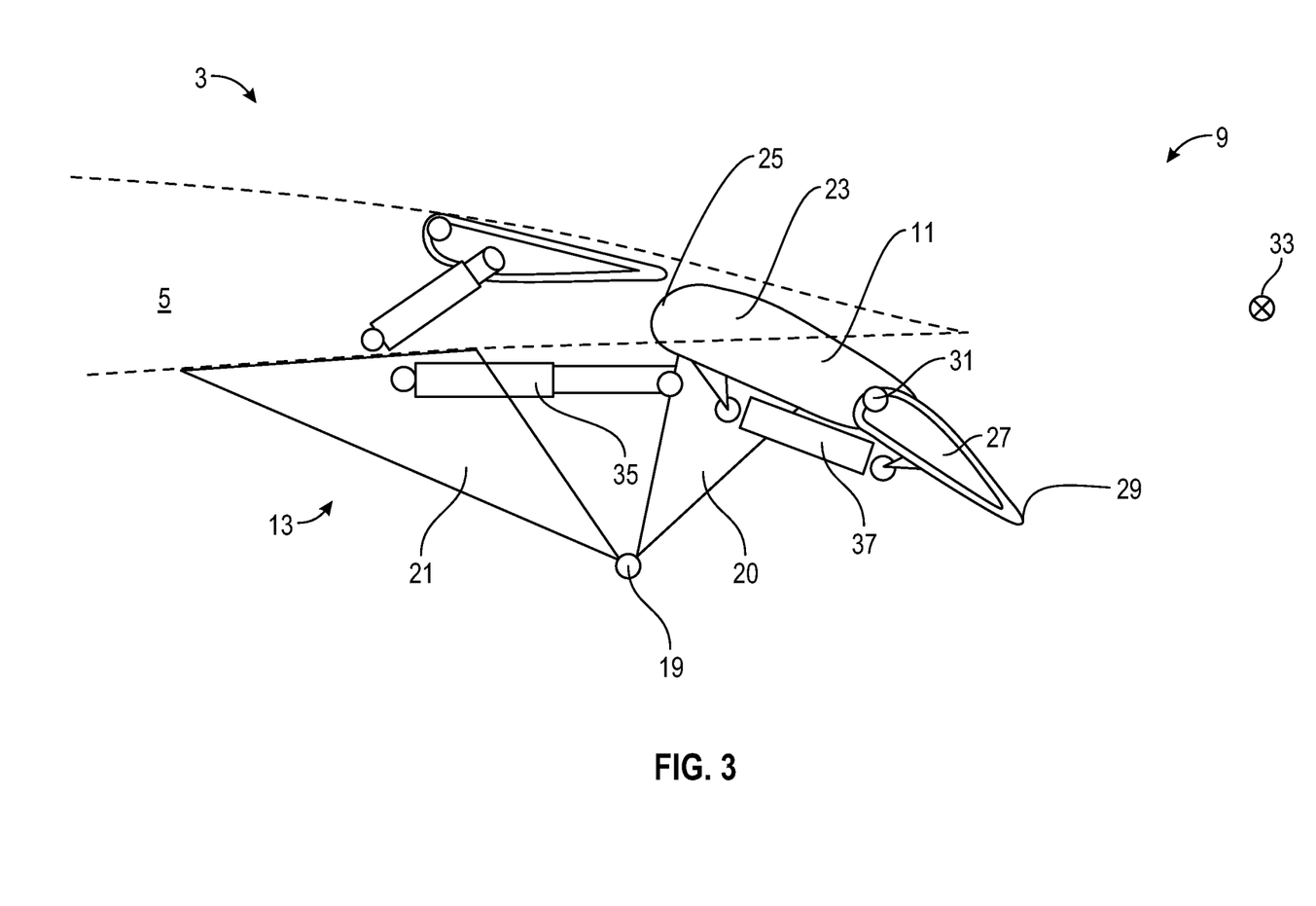
FIG. 3 is a schematic cross sectional view across the span direction of the wing shown in FIG. 2 with a focus on the trailing edge high lift assembly including the flap.
Figure 4A:
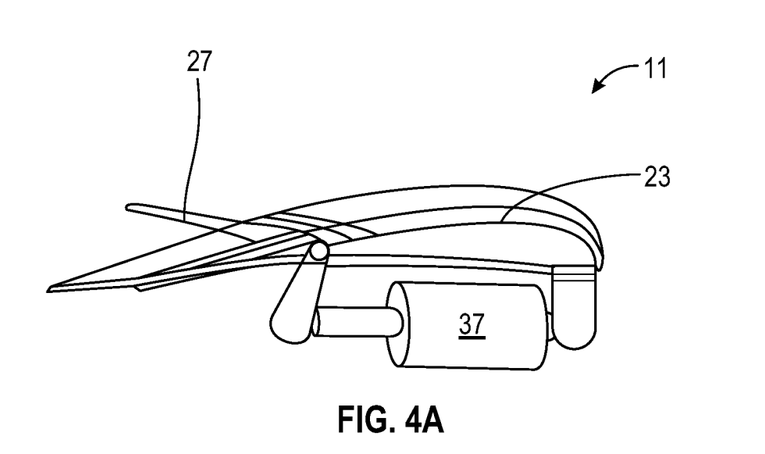
FIG. 4A is a schematic side view of a flap of the trailing edge high lift assembly shown in FIG. 3 with the trailing edge part of the flap in a first setting relative to the leading edge part as actuated by the actuator unit.
Figure 4B:
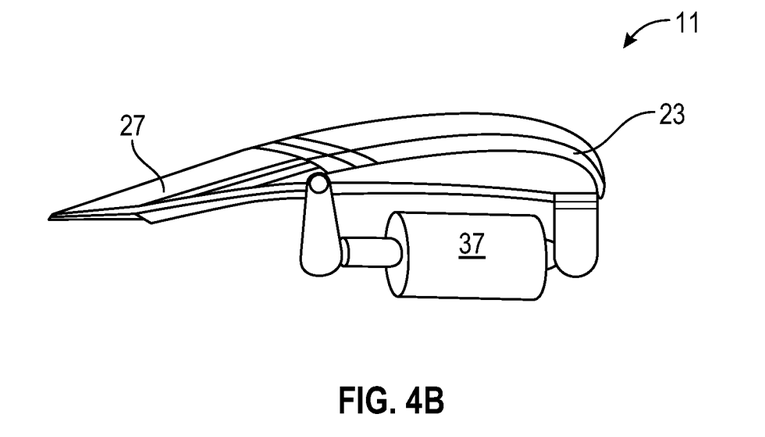
FIG. 4B is a schematic side view of a flap of the trailing edge high lift assembly shown in FIG. 3 with the trailing edge part of the flap in a second setting relative to the leading edge part as actuated by the actuator unit.
Figure 4C:
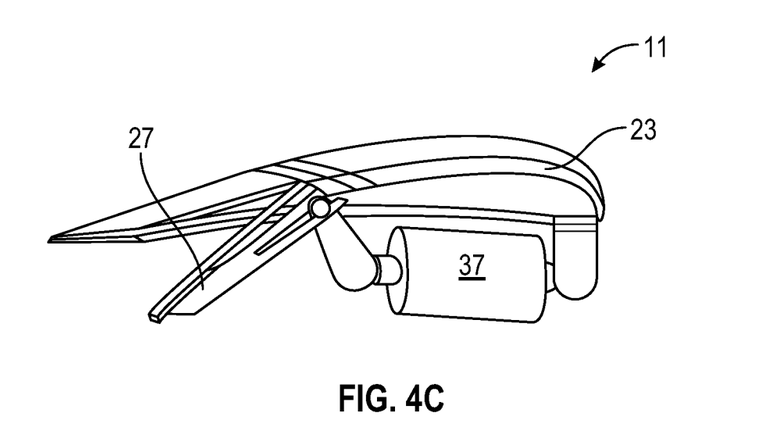
FIG. 4C is a schematic side view of a flap of the trailing edge high lift assembly shown in FIG. 3 with the trailing edge part of the flap in a third setting relative to the leading edge part as actuated by the actuator unit, FIG. 5 a schematic perspective view of the flap shown in FIGS. 4A to 4C, FIG. 6 a first schematic cross sectional view of the flap shown in FIG. 5 with a view on the first linkage, and FIG. 7 a second schematic cross sectional view of the flap shown in FIG. 5 with a view on the first actuator element.

FIGS. 2 and 3 illustrate an embodiment of the wing component 3 of the aircraft 1 shown in FIG. 1. The wing component 3 comprises a main wing 5 and a trailing edge high lift assembly 9. The trailing edge high lift assembly 9 is movably arranged at a trailing edge of the main wing 5 and comprises a flap 11 and a connection assembly 13. The connection assembly 13 movably mounts the flap 11 to the main wing 5, such that the flap 11 is movable between a retracted position with a reduced chord length and curvature of the wing component 3, and at least one extended position with an extended chord length and curvature of the wing component 3. The flap 11 is mounted to the main wing 5 in a manner rotatable about a flap rotation axis 19, wherein the flap rotation axis 19 is located outside the flap profile spaced apart from the flap 11 by a flap lever arm 20. The flap lever arm 20 is mounted to the main wing 5 via a rib 21 that projects downwards from the lower side of the main wing 5 and that is mounted to the lever arm 20 rotatably via the flap rotation axis 19. The flap 11 comprises a leading edge part 23 including the leading edge 25 of the flap 11, and a trailing edge part 27 including the trailing edge 29 of the flap 11 and mounted to the leading edge part 23 in a manner pivotable about a pivot axis 31 extending in a span direction 33.

As shown in FIG. 3, the connection assembly 13 comprises an actuation system 35, e.g. including a rotary motor or a linear motor, for moving the flap 11 relative to the main wing 5 between the retracted position and the at least one extended position. Further, the trailing edge high lift assembly 9 comprises an actuator unit 37, e.g. including a rotary motor or a linear motor, configured for moving the trailing edge part 27 relative to the leading edge part 23 about the pivot axis 31, see FIGS. 3 and 4. The actuator unit 37 in the present embodiment is formed separately from the actuation system 35, as indicated in FIG. 3. The flap 11 comprises a damper device 39 configured for damping uncontrolled movement between the leading edge part 23 and the trailing edge part 27, e.g. in case of a failure of the actuator unit 37, see FIGS. 5 and 6.

Figure 5:
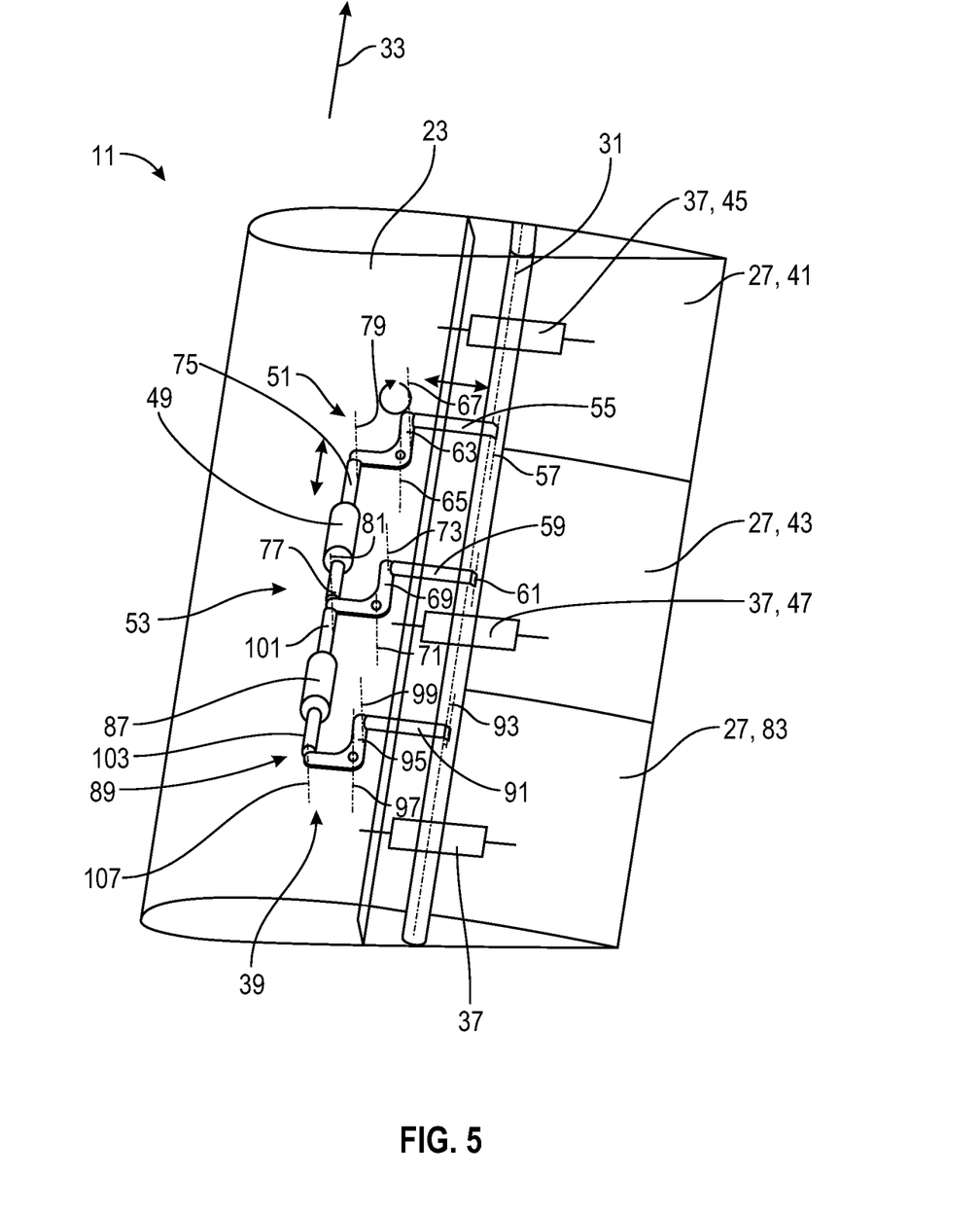
Figure 6:
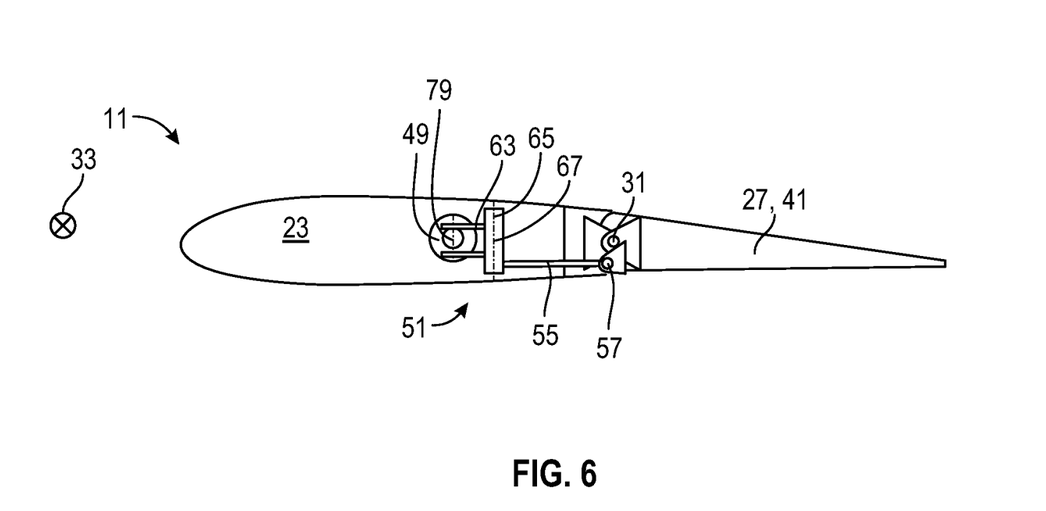
Figure 7:
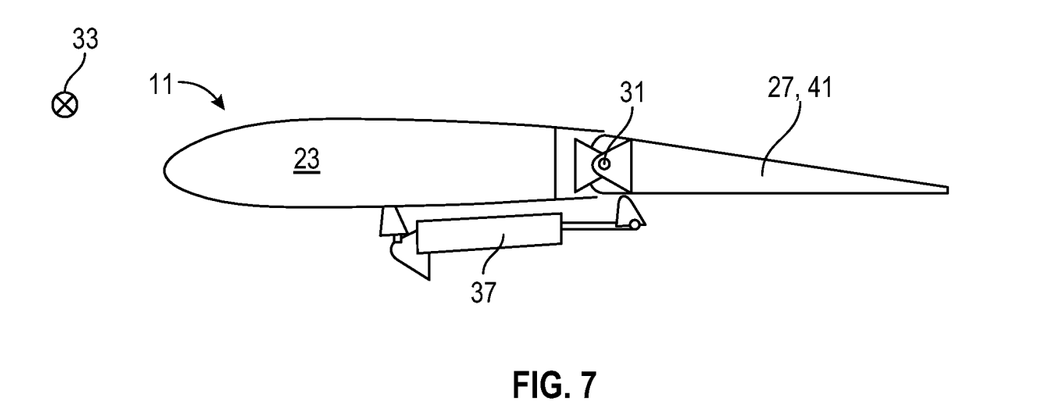

As shown in FIGS. 5 to 7, the trailing edge part 27 comprises a first part portion 41 and a second part portion 43 that are formed separately, arranged next to each other in a span direction 33 and configured to pivot about the pivot axis 31 individually, i.e. independently from one another. The actuator unit 37 comprises a first actuator element 45 and a second actuator element 47, wherein the first actuator element 45 is coupled between the first part portion 41 and the leading edge part 23 for moving the first part portion 41 relative to the leading edge part 23, and wherein the second actuator element 47 is coupled between the second part portion 43 and the leading edge part 23 for moving the second part portion 43 relative to the leading edge part 23. The damper device 39 comprises a damping element 49 coupled between the first part portion 41 and the second part portion 43 to damp relative movement of the first part portion 41 and the second part portion 43 about the pivot axis 31. This means, when the first part portion 41 and the second part portion 43 are moved synchronously, no damping occurs as no relative movement between the first part portion 41 and the second part portion 43 occurs. However, when the first part portion 41 and the second part portion 43 move in an asynchronous way, as would be the case during uncontrolled flutter of the first part portion 41 and/or the second part portion 43 caused e.g. by a failure of the actuator unit 37, in particular of the first actuator element 45 and/or of the second actuator element 47, the damping element 49 causes a damping effect with respect to said asynchronous movement.

The damper device 39 comprises a first linkage 51 and a second linkage 53 arranged next to the first linkage 51 in the span direction 33. The first linkage 51 is coupled between the first part portion 41 and the damping element 49, and the first linkage 51 is configured to translate a pivot movement of the first part portion 41 into a linear movement of the damping element 49 in the span direction 33. Additionally, the second linkage 53 is coupled between the second part portion 43 and the damping element 49, and the second linkage 53 is configured to translate a pivot movement of the second part portion 43 into a linear movement of the damping element 49 in the span direction 33.

The first linkage 51 comprises a first link 55 mounted to the first part portion 41 in a way rotatable about a first link axis 57 spaced apart from the pivot axis 31 in parallel to the pivot axis 31. Additionally, the second linkage 53 comprises a second link 59 mounted to the second part portion 43 in a way rotatable about a second link axis 61 spaced apart from the pivot axis 31 in parallel to the pivot axis 31.

The first linkage 51 comprises a first deflector element 63 mounted to the leading edge part 23 in a way rotatable about a first deflector axis 65, wherein the first deflector axis 65 extends perpendicularly to the pivot axis 31. The first deflector element 63 is configured to deflect a direction of linear movement and in the present embodiment is formed as a rocker element. The first link 55 is mounted to the first deflector element 63 in a way rotatable about a first input axis 67 spaced apart from the first deflector axis 65 in parallel to the first deflector axis 65. Additionally, the second linkage 53 comprises a second deflector element 69 mounted to the leading edge part 23 in a way rotatable about a second deflector axis 71, wherein the second deflector axis 71 extends perpendicularly to the pivot axis 31. The second deflector element 69 is configured to deflect a direction of linear movement and in the present embodiment is formed as a rocker element. The second link 59 is mounted to the second deflector element 69 in a way rotatable about a second input axis 73 spaced apart from the second deflector axis 71 in parallel to the second deflector axis 71.

The damping element 49 has a first coupling end 75 in the form of a rod, and an opposite second coupling end 77 in the form of a rod. The damping element 49 is configured to damp relative linear movement of the first coupling end 75 and the second coupling end 77.

The first coupling end 75 is mounted to the first deflector element 63 in a way rotatable about a first output axis 79 spaced apart from the first deflector axis 65 and from the first input axis 67 in parallel to the first deflector axis 65 and the first input axis 67. Additionally, the second coupling end 77 is mounted to the second deflector element 69 in a way rotatable about a second output axis 81 spaced apart from the second deflector axis 71 and from the second input axis 73 in parallel to the second deflector axis 71 and the second input axis 73. The first coupling end 75 is mounted to the first deflector element 63 and the second coupling end 77 is mounted to the second deflector element 69 in such a way that the damping element 49 between the first and second coupling ends 75, 77 extends in the span direction 33.

The trailing edge part 27 comprises a third part portion 83 formed separately from the first and second part portions 41, 43, arranged next to the second part portion 43 in the span direction 33 and configured to pivot about the pivot axis 31 individually, i.e. independently from the first and second part portions 41, 43. The damping element 49 is a first damping element and the damper device 39 comprises a second damping element 87 coupled between the second part portion 43 and the third part portion 83 to damp relative movement of the second part portion 43 and the third part portion 83.

The damper device 39 comprises a third linkage 89 arranged next to the second linkage 53 in the span direction 33. The third linkage 89 is coupled between the third part portion 83 and the second damping element 87, and the third linkage 89 is configured to translate a pivot movement of the third part portion 83 into a linear movement of the second damping element 87 in the span direction 33.

The third linkage 89 comprises a third link 91 mounted to the third part portion 83 in a way rotatable about a third link axis 93 spaced apart from the pivot axis 31 and in parallel to the pivot axis 31.

The third linkage 89 comprises a third deflector element 95 mounted to the leading edge part 23 in a way rotatable about a third deflector axis 97, wherein the third deflector axis 97 extends perpendicularly to the pivot axis 31. The third deflector element 95 is configured to deflect a direction of linear movement and in the present embodiment is formed as a rocker element. The third link 91 is mounted to the third deflector element 95 in a way rotatable about a third input axis 99 spaced apart from the third deflector axis 97 and in parallel to the third deflector axis 97.

The second damping element 87 has a first coupling end 101 in the form of a rod, and an opposite second coupling end 103 in the form of a rod. The second damping element 87 is configured to damp relative linear movement of its first coupling end 101 and its second coupling end 103.

The first coupling end 101 of the second damping element 87 is mounted to the second deflector element 69 in a way rotatable about the second output axis 81. Additionally, the second coupling end 103 of the second damping element 87 is mounted to the third deflector element 95 in a way rotatable about a third output axis 107 spaced apart from the third deflector axis 97 and from the third input axis 99 in parallel to the third deflector axis 97 and the third input axis 99. Preferably, the first coupling end 101 of the second damping element 87 is mounted to the second deflector element 69 and the second coupling end 103 of the second damping element 87 is mounted to the third deflector element 95 in such a way that the second damping element 87 between the first and second coupling ends 101, 103 extends in the span direction 33 and coaxial with the damping element 49.

The damping element 49 as well as the second damping element 87, is formed as a velocity-dependent damping element having a damping characteristic with essentially higher damping effect for high velocity motion of the first, second and third part portions 41, 43, 83, as would be the case for instable flutter of the first, second and third part portions 41, 43, 83, and essentially lower or no damping effect for low velocity motion of the first, second and third part portions 41, 43, 83, as would be the case for controlled movement of the first, second and third part portions 41, 43, 83, e.g. for gust response. By such a velocity-dependent damping element uncontrolled flutter can be damped while the trailing edge part 27 and its first, second, and third part portions 41, 43, 83, respectively, can be used to control the wing component 3 and the associated aircraft 1 about its axes.

By the trailing edge high lift assembly 9 according to the invention, a more efficient, failure-tolerant and space-efficient damping can be achieved. The damper device 39 introducing a relative damping between the first and second part portions 41, 43 will not be affected by failure of the actuator unit 37 and is thus very failure-tolerant. Further, the damper device 39 does not require much space and its position does not depend on the actuator unit 37, so it can be formed in a very space-efficient way. Additionally, by the connection of the first and second part portions 41, 43 through the damping element 49, in case of failure of one of the first and second actuator elements 45, 47, the respective first or second part portion 41, 43 related to the failing first or second actuator element 45, 47 can be moved through the other one of the first and second part portions 41, 43 and the associated still-operating first or second actuator element 45, 47.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing component for an aircraft, comprising:
    a leading edge part and a trailing edge part mounted to the leading edge part in a manner pivotable about a pivot axis,
    an actuator unit configured for moving the trailing edge part relative to the leading edge part, and
    a damper device configured for damping uncontrolled movement between the leading edge part and the trailing edge part,
    wherein the trailing edge part comprises a first part portion and a second part portion arranged next to each other in a span direction and configured to pivot about the pivot axis individually, and
    wherein the damper device comprises a damping element configured to dampen relative movement of both the first part portion and the second part portion.

2. The wing component according to claim 1, wherein the damper device comprises a first linkage, a second linkage, or both,
    wherein the first linkage is coupled between the first part portion and the damping element, and is configured to translate a pivot movement of the first part portion into a linear movement of the damping element,
    wherein the second linkage is coupled between the second part portion and the damping element, and is configured to translate a pivot movement of the second part portion into a linear movement of the damping element.

3. The wing component according to claim 2, wherein the first linkage comprises a first link mounted to the first part portion in a way rotatable about a first link axis spaced apart from the pivot axis, or
    wherein the second linkage comprises a second link mounted to the second part portion in a way rotatable about a second link axis spaced apart from the pivot axis, or
    both.

4. The wing component according to claim 3, wherein the first linkage comprises a first deflector element mounted to the leading edge part in a rotatable way about a first deflector axis, wherein the first deflector axis extends transverse to the pivot axis, and
    wherein the first link is mounted to the first deflector element in a rotatable way about a first input axis spaced apart from the first deflector axis, or
    wherein the second linkage comprises a second deflector element mounted to the leading edge part in a rotatable way about a second deflector axis, wherein the second deflector axis extends transverse to the pivot axis, and
    wherein the second link is mounted to the second deflector element in a rotatable way about a second input axis spaced apart from the second deflector axis, or
    both.

5. The wing component according to claim 4, wherein the damping element has a first coupling end and a second coupling end opposite the first coupling end,
    wherein the damping element is configured to damp relative linear movement of the first coupling end and the second coupling end.

6. The wing component according to claim 5, wherein the first coupling end is mounted to the first deflector element in a rotatable way about a first output axis spaced apart from the first deflector axis and from the first input axis, or wherein the second coupling end is mounted to the second deflector element in a rotatable way about a second output axis spaced apart from the second deflector axis and from the second input axis, or both.

7. The wing component according to claim 5, further comprising a second damping element with a first coupling end and a second coupling end opposite the first coupling end, wherein the second damping element is configured to damp relative linear movement of the first coupling end of the second damping element and the second coupling end of the second damping element.

8. The wing component according to claim 7, wherein the first coupling end of the second damping element is mounted to the second deflector element in a rotatable way about a second output axis or about a further output axis spaced apart from the second deflector axis and from the second input axis, or wherein the second coupling end of the second damping element is mounted to a third deflector element in a rotatable way about a third output axis spaced apart from a third deflector axis and from a third input axis, or both.

9. The wing component according to claim 1, wherein the trailing edge part comprises a third part portion arranged next to the second part portion in the span direction and configured to pivot about the pivot axis individually, wherein the damping element is a first damping element and the damper device comprises a second damping element coupled between the second part portion and the third part portion to damp relative movement of the second part portion and the third part portion.

10. The wing component according to claim 9, wherein the damper device comprises a third linkage, wherein the third linkage is coupled between the third part portion and the second damping element, and is configured to translate a pivot movement of the third part portion into a linear movement of the second damping element.

11. The wing component according to claim 10, wherein the third linkage comprises a third link mounted to the third part portion in a rotatable way about a third link axis spaced apart from the pivot axis.

12. The wing component according to claim 11, wherein the third linkage comprises a third deflector element mounted to the leading edge part in a rotatable way about a third deflector axis, wherein the third deflector axis extends transverse to the pivot axis, and wherein the third link is mounted to the third deflector element in a rotatable way about a third input axis spaced apart from the third deflector axis.

13. The wing component according to claim 1, wherein the damping element is formed as a velocity-dependent damping element.

14. The wing component according to claim 1, wherein the wing component is a wing comprising a main wing, and a trailing edge high lift assembly movably arranged at a trailing edge of the main wing, the trailing edge high lift assembly comprising a flap, and a connection assembly for movably mounting the flap to the main wing, such that the flap is movable between a retracted position and at least one extended position, wherein the flap comprises the leading edge part and the trailing edge part mounted to the leading edge part in a manner pivotable about the pivot axis.

15. An aircraft comprising:

the wing component according to claim 1.

* * * * *